Oct. 4, 1927.
H. D. CHURCH
1,644,653
SHOCK ABSORBER FOR VEHICLES
Original Filed Feb. 15, 1923
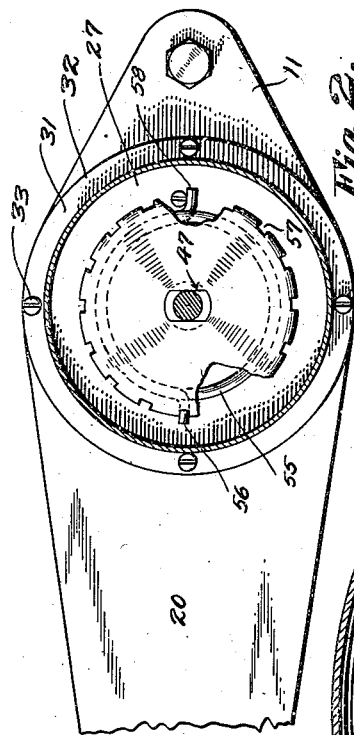
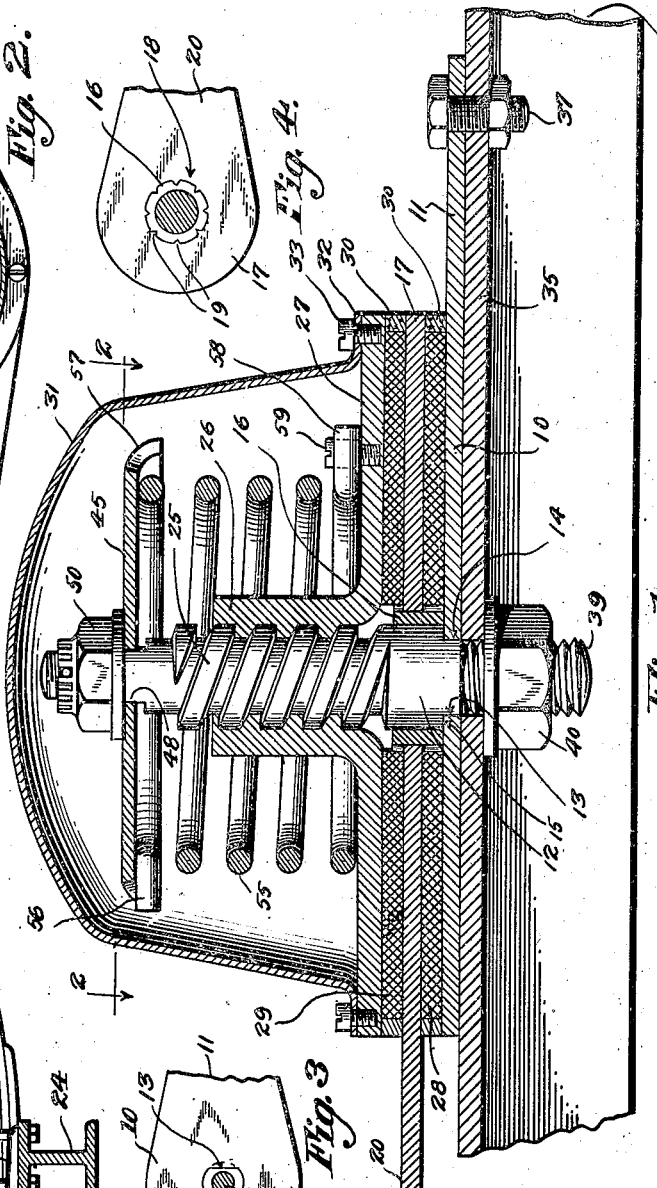
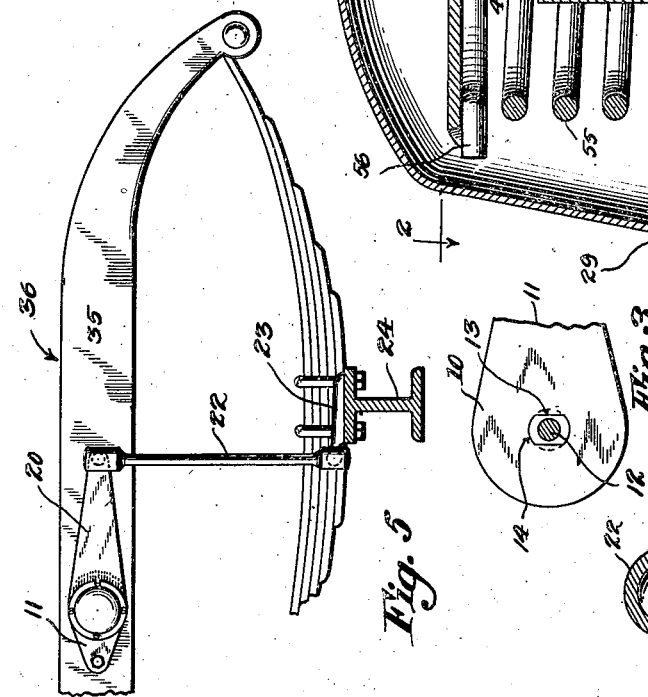
Inventor.
Harold D. Church.

Patented Oct. 4, 1927.

1,644,653

UNITED STATES PATENT OFFICE.

HAROLD D. CHURCH, OF FAIRFIELD, CONNECTICUT, ASSIGNOR OF ONE-THIRD TO CHARLES MARCUS, OF NEW YORK, N. Y., AND ONE-THIRD TO RAYMOND P. LANSING, OF MONTCLAIR, NEW JERSEY.

SHOCK ABSORBER FOR VEHICLES.

Application filed February 15, 1923, Serial No. 619,157. Renewed March 3, 1927.

My invention relates to shock absorbers for vehicles, of the general type disclosed in an application of Charles Marcus, Serial No. 600,082, filed November 10, 1922, with important modifications and improvements.

An important object of the invention is to provide a simple, strong and durable friction shock absorber which dispenses with any fluid retarding medium, and in which the frictional effect is produced by the combined action of spring means and inclined surfaces, and in which, also, the retarding effect is applied in both directions of movement, with a greater retarding effort exerted in one direction than in the other.

Another object is to provide, in connection with other features, a small range or degree of relatively free movement.

The characteristics and advantages of the invention are further sufficiently explained in connection with the following detail description of the accompanying drawings, which illustrate one exemplifying embodiment of the invention. After considering this exemplification, persons skilled in the art will understand that modifications may be made within the principles of the invention; and I contemplate the employment of any structures that are properly within the scope of the appended claims.

In the drawings:

Figure 1 is a horizontal, longitudinal section of a shock absorber embodying the invention in one form;

Figure 2 is a section at 2—2, Figure 1;

Figures 3 and 4 are explanatory details;

Figure 5 is a view in side elevation, showing sufficient parts of a motor vehicle to illustrate one mode of application of the device to a vehicle.

The shock absorber in one physical embodiment may have a general structure or organization substantially similar to that disclosed in the above-mentioned application of Charles Marcus, including a friction plate 10 having a short arm-extension 11. A screw spindle 12 is secured against relative rotation at the center of plate 10 and by flat surfaces 13 engaging similar faces of a hole 14 in the plate. Adjacent to faces 13, the spindle is formed with shoulders 15 adapted to rest against the outer surface of the plate. A bushing 16 is arranged to oscillate, with a bearing fit, on a cylindrical portion of the spindle, adjacent to plate 10. A second friction plate 17 is arranged parallel to plate 10. Bushing 16 is located in a central hole 18 in this plate, and secured irrevolubly in the plate by teeth 19 formed in the plate aperture. An arm 20 extends from plate 17, and at the outer end this arm has a ball-end fitting 21 to co-operate with a connecting link 22, the other end of the link being connected to any suitable fitting 23 on or connected to the vehicle axle 24, Figure 4. On spindle 12 is a screw thread 25, and usually this is a multiple thread of rather steep pitch, the pitch being variable within considerable limits, as explained hereafter. A nut 26 is located on the spindle in engagement with the screw thread 25, and the nut has a flange 27 which is usually circular, and parallel to the plates 10 and 17. The nut on its flange is identified hereafter, in some cases, as a "pressure member." While the plates and the nut flange might in some cases have direct frictional engagement, it is usually preferable to interpose between the adjacent surfaces of these members friction disks 28 and 29 which may be secured to plate 17, or they may in some cases be free to move independently. The disks are centered on ends of the bushing 16, and annular washers 30 of cork or other suitable material may be placed between plates 10 and 17 and between plate 17 and nut flange 27 surrounding the peripheries of the friction disks, to exclude dust and grit. The friction disks may be of any suitable material or composition, such as asbestos fabric or other suitable friction material of the kind ordinarily used for brake or clutch facings. A sheet metal housing 31 may be arranged to enclose nut 26 and the outer portion of the spindle, and this housing may have a flange 32 detachably secured to the nut flange 27, as by screws 33. According to one mode of applying the shock absorber to a motor vehicle, plate 10 may be placed against the vertical web 35 of a side frame member 36, either with or without interposed spacers, and may be secured non-rotatively thereon by a screw 37 passing through corresponding holes in the frame web and in the end of arm 11, and by a screw-threaded inward extension 39 of screw spindle 12, this extension passing through a suitable hole bored in the frame web 35 and being locked in position by a nut 40, which serves also in the present case to hold the spindle in proper relation to plate 10. An alternative mode of connecting the device to a vehicle is to connect the end of arm 11 pivotally to the vehicle frame, or a frame fitting, while arm 20 is connected to the axle or an axle fitting. Such alternative methods of connecting a shock absorber of this general type to parts of a vehicle are well known, and will not be further particularly described. The mode of attachment shown in the drawings is a suitable one, and preferable in some cases.

As so far described, the appliance is in substantial accordance with the disclosure of the above identified application of Charles Marcus.

The present invention provides means for applying a suitable predetermined maximum frictional resistance to relative movement of the vehicle frame and axle in one direction, as in the above identified application, and it additionally provides means for applying resistance to relative movement of the said vehicle parts in the other direction, the resistance applied in this case being preferably less than in the first instance. More particularly stated, the device may be arranged to apply a certain maximum frictional resistance to divergent movement of the vehicle frame and axle, that is to say, to the expansion movement of the vehicle spring, and a smaller amount of frictional resistance to the convergent movement of the frame and axle, that is to say, to the compression of the vehicle spring. Or the conditions may be reversed without any necessary change in the structure of the appliance by merely reversing its position, so that the maximum frictional resistance will be opposed to convergent movement of the vehicle frame and axle, that is to say, to the spring compression, and the smaller amount of resistance will be opposed to divergent movement of the vehicle parts, that is to say, to the spring expansion or recoil. Either arrangement is desirable in some cases. For the sake of brevity, I will more particularly describe the appliance hereafter as being arranged to oppose the maximum resistance to vehicle spring recoil, and the smaller amount of resistance to the vehicle spring compression, with the understanding that the reverse arrangement may be employed whereever necessary or desirable.

Specifically, in the present embodiment of the invention, the described functions are produced in connection with the screw and nut arrangement above described, by a spring which has a torsional action as in the above identified application, and at the same time has a more direct or thrust action intermediate the nut or nut flange and the screw spindle.

A washer or spring abutment 45 is located on the spindle 12 near its upper end and secured in position in any convenient way, for example by providing the washer with an aperture having parallel straight sides 47 engaging flat faces 48 formed on the spindle, and the washer is locked by a castellated nut 50 engaging the threaded outer end of the spindle so that the washer is securely held against rotation. A spring 55, which is in the present instance a helical spring of substantial "strength", is compressed between the washer and nut flange 27, the thrust of the spring being adjustable by rotation of nut 50 in an obvious way. The upper end 56 of spring 55 is bent outward to engage in one of a series of notches 57 produced at the periphery of washer 45 by slotting the washer margin and bending it downward, and the other end 58 of the spring is bent outward to engage against one side of a stud 59 inserted in nut flange 27. The spring is coiled up to produce the desired torsional tension, tending to rotate the nut flange and nut in a direction to move the flange to clamping position, and this torsional tension is maintained by snapping the spring end 56 into the appropriate notch 57. The nut is then acted upon simultaneously by two forces through the one spring, namely spring thrust exerted in the direction of the axis of the spindle, and torsion exerted by the tendency of the spring to uncoil, this force acting between a fixed point on the periphery of the washer and stud 59.

The operation is as follows:—With the shock absorber arranged as shown in Fig. 4, that is, with a left-hand screw thread on the spindle, if the vehicle axis is supposed to be below the frame member 36, the maximum resistance will be opposed to the vehicle spring compression; but if the vehicle frame and the appliance are supposed to be viewed from below, in which case the vehicle axle would be between the observer and the drawing, the maximum resistance will be opposed to vehicle spring expansion. In either case the action of the device can be reversed by substituting a spindle having a right-hand thread with a correspondingly threaded nut or, without changing any part of the appliance, the action can be reversed by changing the direction of arm 20. It will be sufficient to explain the operation of the device as shown in Fig. 1, understanding that this device is supposed to be viewed from below, in which case maximum resistance will be afforded to vehicle spring expansion or recoil.

When the road wheel of the vehicle encounters any obstacle tending to move the vehicle axle upward in relation to the frame, the vehicle spring is compressed and at the same time the axle movement causes the end of arm 20 to be moved upward or away from the eye of the observer in Fig. 1. This movement of arm 20 and the connected plate 17 is resisted by friction between faces of the friction disks and plate 10 and nut flange 27. Friction disk 29 moving with plate 17, tends to rotate nut flange 27 and nut 26 on the spindle threads in a direction away from disc 29. Stud 59 bears against the end 58 of spring 55, and the described movement of the nut flange therefore tends to coil up the spring as the nut flange is retracted somewhat by the action of the screw threads to relax the friction pressure between the various plates and disks. A substantial amount of frictional resistance is, however, maintained by the thrust action of the spring exerted between washer 45 and the nut flange, this pressure tending continually to run the nut inward or toward plate 10, and also by the torsional effect of spring 55 which tends to turn the nut in the same direction, or in other words to resist the tendency of the nut to rotate in a direction determined by the stated direction of movement of the arm 20. Otherwise described, the spring acts during the described convergent movement of the vehicle axle and frame both by thrust and by torsion to maintain friction pressure between the various friction surfaces, but this spring effect is counter-acted to a considerable extent by the rotative tendency of the nut, this tendency serving to urge the nut outward against the combined spring effects, and cancelling a certain part of the spring action.

At the end of the described axle movement and during a short part of the ensuing opposite axle movement or divergent movement of the vehicle axis and frame caused by the vehicle spring recoil, the frictional resistance is not increased, this degree of movement corresponding to the amount of rotative travel of the nut necessary to take up clearance between the nut and spindle screw threads. In this movement of the vehicle parts arm 20 moves toward the eye of the observer in Fig. 1. The movement of friction disk 29 with plate 17 urges nut flange 27 to rotate in the direction opposite to the previously described movement, or so that the upper surfaces of the nut screw threads as viewed in Fig. 1 come in contact with the lower surfaces of the spindle threads. At the end of the small arc of movement above mentioned necessary to bring about the changed screw thread engagement, the continued movement of arm 20 acting frictionally through disk 29 and nut flange 27 causes the nut to rotate slightly farther about the spindle, this rotative tendency of the nut being amplified by the torsional effect of spring 55. The inclination of the screw threads thus forces the nut flange inward toward plate 10, and the friction surfaces are clamped together during the remaining part of the stated vehicle spring recoil movement by the combined forces due to the inclination of the screw threads, and the thrust and torsion of spring 55. The frictional resistance thus produced in the stated direction of movement of the vehicle parts is very substantial, and usually very much greater than the frictional resistance to the other vehicle part movement. During the movement of arm 20 which tends to produce a clamping action of the nut and its flange by reason of the action of the screw threads, the pressure exerted on the inward faces of the spindle threads in contact with the outer faces of the nut threads is relieved in proportion to the thrust effect of spring 55. This materially increases the smoothness or uniformity of operation during the stated movement of the vehicle parts. The fact, also, that a substantial part of the friction pressure during the stated vehicle part movement is produced by the thrust of spring 55, permits the angle of the screw threads to be made steeper than would otherwise be necessary to produce the same frictional effect; and in this way also the screw threads are relieved to a certain extent of their duty in applying the maximum frictional effect for which the appliance is designed (as in the case of the above identified application), and the action of the appliance is made more uniform and certain, since it is not dependent to the same extent upon the condition of the screw threads with reference to their smoothness or "finish" or the amount or lubrication, or other conditions.

When it is desired to apply the maximum frictional resistance to the other direction of movement of the vehicle parts, that is to say, to convergent movement of the frame and axle, the appliance is simply re-arranged as previously explained.

The angle of the screw threads 25 is usually made rather steep so that there is no possibility of a complete locking or clamping action. The exact angle of the threads depends on the maximum frictional resistance desired, the weights of the vehicle frame and axle structures, the average speed of the vehicle, the average vehicle load, the mean radius of the friction surfaces, and the characteristics of the spring 55. The torsional effect of the spring is varied in accordance with the angle of the screw thread and other conditions, these matters being determined by the particular conditions of service for which the appliance is intended. Without other change, however, substantial variations in the action of the appliance may be produced by varying the total length of the spring to change its thrust effect, or by adjusting it to change its torsional effect in the manner previously explained.

I claim:

1. A vehicle-spring-action controlling appliance, comprising relatively movable friction members, spring means exerting a combined thrust and torsional effect tending to urge said members to frictional engagement, and frictionally operated means acting to amplify the spring effect in one direction of relative movement of said members and to reduce the spring effect in the other direction of relative movement.

2. A shock absorber for vehicles, comprising relatively movable friction plates, spring means exerting a combined thrust and torsional effect tending to urge said plates to frictional engagement, and means including a pressure member and a cooperating inclined surface acting to amplify the spring effect in one direction of relative movement of said plates and to reduce the spring effect in the other direction of relative movement.

3. A shock absorber for vehicles, comprising two friction members arranged for relative oscillation about a common axis, an inclined actuating member nonrotatively located in relation to one of said friction members, means cooperating with said inclined member to urge said friction members into frictional engagement in one direction of their relative movement, and a spring cooperating with said means by combined thrust and torsional effect to oppose a predetermined maximum frictional resistance to relative movement of said friction members in one direction and a smaller amount of resistance to movement of said members in the opposite direction.

4. A shock absorber for vehicles, comprising two friction plates arranged for relative oscillation about a common axis, an inclined actuating member nonrotatively located in relation to one of said plates, a pressure member means co-operating with said inclined member to urge said plates into frictional engagement in one direction of their relative movement, and spring means cooperating with said pressure member by combined thrust and torsional effect to oppose a predetermined maximum frictional resistance to relative movement of said plates in one direction and a smaller amount of resistance to movement of said plates in the opposite direction.

5. A shock absorber for vehicles, comprising a plate adapted to be connected to a vehicle member, another plate adapted to be connected to another relatively movable vehicle member, said plates being arranged for relative rotation on a common axis, a member secured non-rotatively in relation to one of the plates and having an inclined surface, a pressure member engaging the inclined surface and arranged to urge the plates to frictional contact, and spring means cooperating with the pressure member and acting by combined thrust and torsional effect to amplify the frictional action of the pressure member in one direction of movement of said plates, the inclined surface and pressure member serving to counteract the spring effect to a certain extent and reduce the effective friction in the other direction of plate movement.

6. A shock absorber for vehicles, comprising a plate adapted to be connected to a vehicle member, another plate arranged adjacent to the first named plate and adapted to be connected to another relatively movable vehicle member, said plates being arranged for relative rotation on a common axis, a screw secured non-rotatively in relation to one of the plates, a nut engaging the screw and arranged to urge the plates to frictional contact, and spring means cooperating with the nut and acting by combined thrust and torsion to amplify the clamping action of the nut and screw in one direction of movement of said plates, the nut and screw serving to counteract the spring effect to a certain extent and reduce the effective friction in the other direction of plate movement.

7. A shock absorber for vehicles, comprising a friction plate adapted to be connected to a vehicle member, a cooperating friction plate having an arm adapted to be connected to another relatively movable vehicle member, a spindle non-rotatively secured in relation to one of the plates, a steep-pitch screw thread on the spindle, a nut engaging the screw thread and having a flange confronting one of the plates, and a spring acting on the nut by combined thrust and torsion to amplify the friction effect of the screw thread in one direction of plate movement, the screw and nut acting to reduce the spring-thrust effect in the other direction of plate movement.

8. A shock absorber for vehicles, comprising a friction plate adapted to be connected to a vehicle member, a cooperating friction plate having an arm adapted to be connected to another relatively movable vehicle member, a spindle non-rotatively secured to one of the plates, a steep pitch screw thread on the spindle, a nut engaging the screw thread and having a flange confronting one of the plates, friction disks between the plates and between the flange and one of the plates, and a spring acting on the nut by combined thrust and torsion to amplify the friction effect of the screw thread in one direction of plate movement, the screw and nut acting to reduce the friction effect due to spring thrust in the other direction of plate movement.

9. A shock absorber for vehicles, comprising a friction plate adapted to be secured to a vehicle frame member, another cooperating friction plate arranged for relative rotation and having an arm adapted to be secured to another relatively movable vehicle member, a spindle non-rotatively secured in relation to one of the plates at the axis of plate movement, a steep-pitch screw thread on the spindle, a pressure member having threaded engagement with the spindle thread, a spring abutment secured to the spindle, and a helical spring located operatively between said abutment and the nut and compressed to have a thrust action and also tensioned torsionally to urge the nut rotatively in one direction.

10. A shock absorber for vehicles, comprising a friction plate adapted to be secured to a vehicle frame member, another cooperating friction plate arranged for relative rotation and having an arm adapted to be secured to another relatively movable vehicle member, a spindle non-rotatively secured in relation to one of the plates at the axis of plate movement, a steep-pitch screw thread on the spindle, a pressure member having threaded engagement with the spindle thread, a spring abutment secured to the spindle, and a helical spring located operatively between said abutment and the nut and compressed to have a thrust action and also tensioned torsionally to urge the nut rotatively in one direction, the spring abutment having means cooperating with the spring to admit of regulation of the spring torsion.

11. A shock absorber for vehicles, comprising a friction plate adapted to be secured to a vehicle frame member, a spindle non-rotatively secured in relation to said plate at the center of its friction surface, another cooperating friction plate arranged for relative rotation about the spindle and having an arm adapted to be secured to another relatively movable vehicle member, a friction disk between the plates, a steep-pitch screw thread on the spindle, a pressure member having threaded engagement with the spindle thread, a spring abutment secured to the spindle, and a helical spring located operatively between said abutment and the nut and compressed to have a thrust action and also tensioned torsionally and connected to the spring abutment and pressure member to urge the nut rotatively in one direction.

12. A shock absorber for vehicles, comprising a friction plate adapted to be secured to a vehicle frame member, a spindle non-rotatively secured in relation to said plate at the center of its friction surface, another cooperating friction plate arranged for relative rotation about the spindle and having an arm adapted to be secured to another relatively movable vehicle member, a friction disk between the plates, a steep-pitch screw thread on the spindle, a pressure member having threaded engagement with the spindle thread, a spring abutment secured to the spindle, and a helical spring located operatively between said abutment and the nut and compressed to have a thrust action and also tensioned torsionally and connected to the spring abutment and pressure member to urge the nut rotatively in one direction, the spring abutment having peripheral notches cooperating with a member of the spring to admit of regulation of the spring torsion.

13. A shock absorber for vehicles, comprising a friction plate adapted to be secured to a frame member of the vehicle, a spindle non-rotatively secured to said plate and having a steep-pitch screw thread, a second friction plate arranged parallel to the first and also having a bearing engagement with the spindle, a nut engaging the spindle thread and having a flange parallel to said second friction plate, friction disks intermediate the friction surfaces of said plates and nut flange, a spring abutment disk secured on the outward end of the spindle and provided with peripheral notches, a helical spring compressed between said abutment disk and the nut flange and having one end arranged for shiftable locking engagement with said notches, and a stud on the flange arranged to engage the other end of said spring.

14. In a shock absorber or spring check for vehicles, a first friction plate, a second relatively oscillatable friction plate, a pressure member arranged to apply retarding friction to the second plate, a spring exerting thrust and torsion tending to urge the pressure member to frictional engagement, and an inclined actuating member in fixed relation to the first plate and cooperating with the pressure member so that the pressure member is actuated by frictional engagement with the second plate when the latter is moved in either direction from any operative position, and the thrust spring and inclined member cooperate to apply a maximum frictional retarding effect to the second plate in one direction of movement and a smaller frictional retarding effect in the other direction of movement.

Signed at New York, in the county of New York and State of New York, this 31st day of January A. D. 1923.

HAROLD D. CHURCH.